United States Patent Office 3,180,172
Patented Apr. 27, 1965

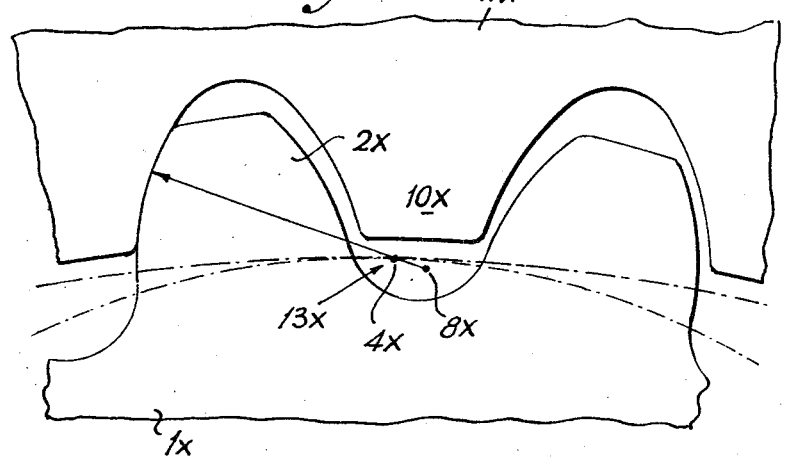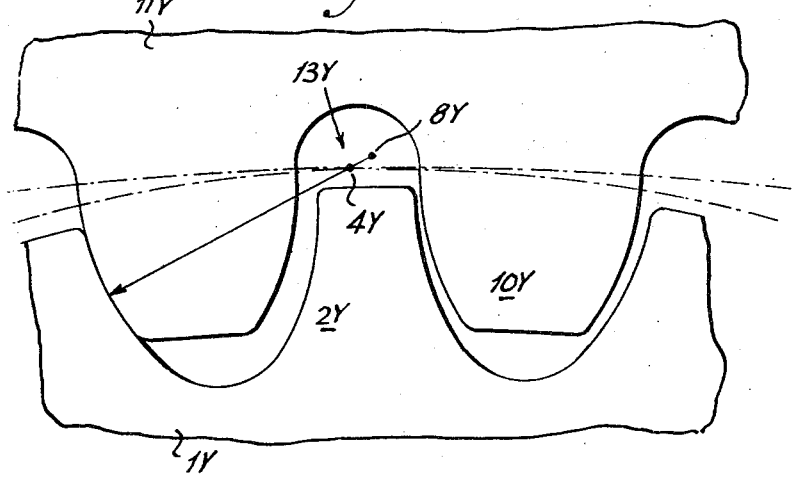

3,180,172
GEAR WHEELS AND RACKS
David Charles Arthur Leggatt, Clifton-upon-Dunsmore, near Rugby, England, assignor to Associated Electrical Industries Limited, London, England, a British company
Filed Nov. 30, 1962, Ser. No. 241,429
Claims priority, application Great Britain, Dec. 11, 1961, 44,264/61
5 Claims. (Cl. 74—462)

This invention relates to improvements in gear wheels and racks, and more particularly to helical gear wheels and racks in which the profiles of the teeth are based on arcs of circles, and in which in use a convex surface on one tooth engages with a concave surface on a tooth of the complementary gear wheel or rack.

Gears of this form are often referred to as "Novikov" gears. It will be appreciated that the radius of curvature of the concave surface must be at least as large as that of the convex surface. In the following description, the various radii of curvature are those of the teeth in sectional planes which are normal to the helix at that point.

The relative radius of curvature of conforming tooth profiles is given by $$\rho_n = \frac{\rho_o \rho_i}{\rho_o - \rho_i}$$

where:
$\rho_o$ = concave flank radius
$\rho_i$ = convex flank radius

The load carrying capacity of such a gear system is, according to the Hertzian theory of compressive stress, approximately proportional to $\rho_n$. Thus it is essential to have $\rho_n$ as large as possible. Therefore both $\rho_o$ and $\rho_i$ should be large but the difference between them should be kept to a minimum.

The tolerance in the distance between the centres of the shafts carrying two such gear wheels is given by $$\delta C = (\rho_o - \rho_i)(\sin \psi_p - \sin \psi_\omega)$$

where $\Psi_p$ and $\Psi_\omega$ are the limiting pressure angles for pinion and wheel respectively. From this it can be seen that allowable centre distance error is directly proportional to the difference in profile radii of curvature.

The criterion in the design of these gears is the centre distance tolerance. This is dictated by manufacturing accuracy of gears and gearbox and by service effects such as shaft deflections, thermal expansion and bearing play and wear. Thus the difference in radii of curvature is fixed and so to increase the load bearing capacity the only possibility is to make $\rho_o$ and $\rho_i$ as large as possible.

One of the conditions of contact for gear teeth is that, in order to produce a constant angular velocity ratio between the two mating gear wheels, or between the mating gear wheel and rack, the common surface normal at the point of contact of a pair of gear teeth must pass through a fixed point known as the pitch point. This is the point where the pitch circles of the two gear wheels touch. In the Wildhaber-Novikov gear form this condition is not true for the whole length of the contacting teeth at any one time. The gears are helical and there is (theoretically) point contact which moves along the axial length of each tooth, but the condition applies instantaneously at the point of contact. In practice, due to elastic deformation of the tooth surface, a small ellipse of contact will exist.

Because the tooth profiles are arcs of circles, to ensure that the common surface normal passes through the pitch point, the centre of curvature of one of the profiles must be on the pitch cylinder so that, at the instant of contact, it lies on the pitch point. Heretofore, it has been the practice to locate the centre of the concave curve on the pitch cylinder.

An object of the present invention is the provision of a helical gear wheel or a gear rack of the type in which the profiles of the teeth are based on arcs of circles, and in which the teeth have an increased load bearing capacity.

The invention includes a helical gear wheel the profiles of the teeth of which at each transverse cross-section are convex curves based on arcs of circles and suitable for use with a complementary gear wheel or rack having concave teeth surfaces engaging with the convex teeth surfaces, wherein the centre of curvature of each convex tooth at each transverse cross-section is located on the pitch cylinder of the gear wheel, whereby the centre of curvature of the complementary concave tooth lies on the side of the pitch cylinder or pitch line of that complementary gear wheel or rack which is remote from the root of the tooth.

The invention also includes a helical gear wheel the profiles of the teeth of which at each transverse cross-section are concave curves based on arcs of circles and suitable for use with a complementary gear wheel or rack having convex teeth surfaces engaging with the concave teeth surfaces, wherein the centre of curvature of each concave tooth at each transverse cross-section lies on the side of the pitch cylinder of the gear wheel which is remote from the root of the tooth.

The invention further includes a gear rack the profiles of the teeth of which at each transverse cross-section are convex curves based on arcs of circles and suitable for use with a complementary gear wheel having concave teeth surfaces engaging with the convex teeth surfaces, wherein the centre of curvature of each convex tooth at each transverse cross-section is located on the pitch line of the gear rack, whereby the centre of curvature of the complementary concave tooth lies on the side of the pitch cylinder of the complementary gear wheel which is remote from the root of the tooth.

The invention moreover includes a gear rack the profiles of the teeth of which at each transverse cross-section are concave curves based on arcs of circles and suitable for use with a complementary gear wheel having convex teeth surfaces engaging with the concave teeth surfaces, wherein the centre of curvature of each concave tooth at each transverse cross-section lies on the side of the pitch line of the gear rack which is remote from the root of the tooth.

The invention will now be described, by way of example, with reference to the accompanying diagrammatic drawings, in which:

FIGURE 4 is a sectional elevation, corresponding to FIGURE 3 of part only of an internally toothed gear wheel and a mating helical gear wheel; and FIGURE 5 is a sectional elevation of an alternative to the arrangement shown in FIGURE 4.

Figure 1:
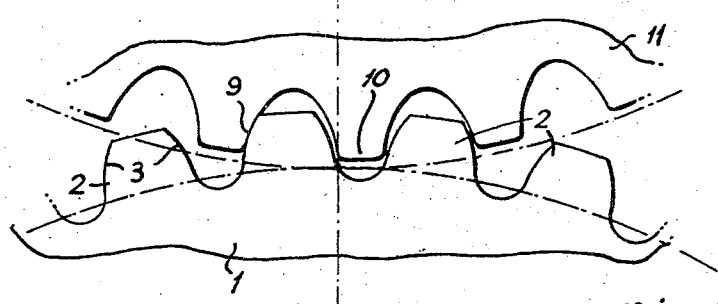
FIGURE 1 is a sectional elevation, in a plane through the point of contact and normal to the helix, of part only of two mating helical gear wheels.
Figure 3:
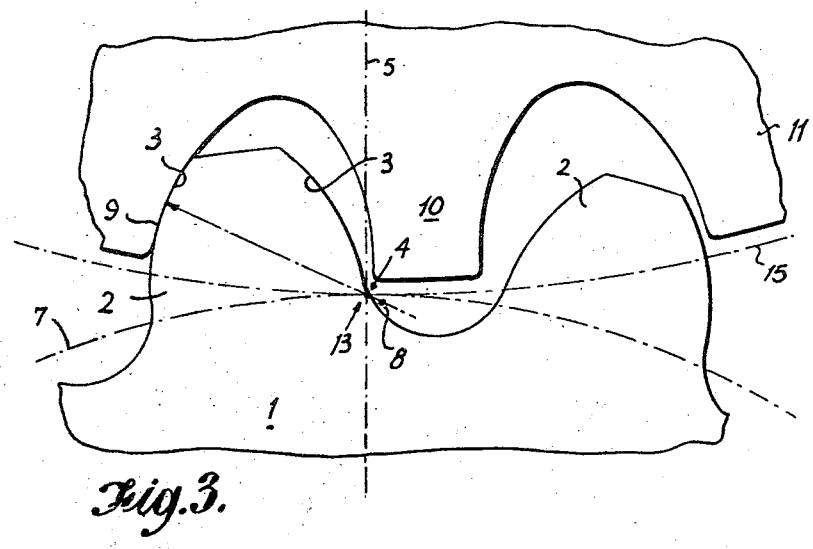
FIGURE 3 is an enlarged sectional elevation of one of the teeth of the upper gear wheel of FIGURE 1 and of the two complementary teeth on the lower gear wheel.

Referring first to FIGURES 1 and 3, the lower gear wheel 1 is provided about its periphery with teeth 2 the working parts 3 of which are arcs of circles. For each tooth, the centre of curvature 4 of the tooth face at each transverse cross-section lies on the pitch circle at such a point that when load is being transmitted, it lies at the pitch point. The centre of curvature 8 of the working parts 9 of the teeth 10 of the upper wheel 11 is below the pitch point 13 where the pitch circle 15 of the upper gear wheel touches the pitch circle 7 of the lower wheel, i.e. is outside the pitch circle of the wheel on which the teeth are provided. The point of contact between the two teeth moves circumferentially along the profiles of both teeth as the tooth approaches the pitch point, and the centre of curvature 8 is suitably chosen to lie on the common normal to the surfaces at the point of contact, when the point 4 lies at the pitch point, where the pitch circle intersects the axis 5 joining the axes of the two gear wheels.

Figure 2:
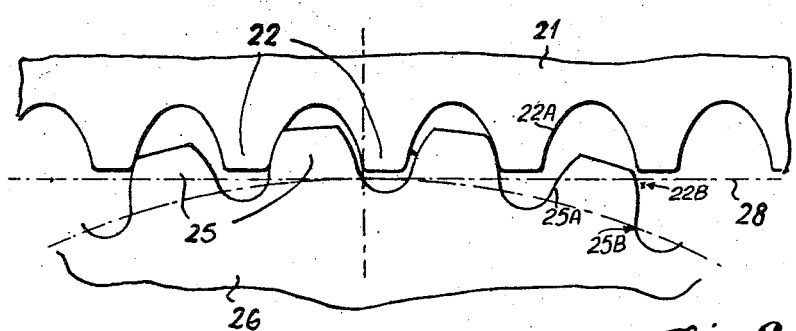
FIGURE 2 is a sectional elevation of part only of a rack and a mating helical gear wheel.

Referring now to FIGURE 2, the rack 21 is provided with teeth 22 which engage teeth 25 on a gear wheel 26. For a rack, the pitch line 28 is a straight line and the centres of curvature of the concave arcuate working parts of the teeth 22 lie below the pitch line 28 (e.g. at 22B for the tooth 22A) while the centres of curvature of the convex arcuate working parts of the teeth 25 lie on the pitch circle of the gear wheel 26 (e.g. at 25B for the tooth 25A).

It will be evident that for a given mismatch of the radii both $\rho_o$ and $\rho_i$ can be increased by the amount of the mismatch.

If $\rho_o$ and $\rho_i$ refer to the radii in a case in which the centre of curvature of the concave tooth is at the pitch point, the factor of increase in load bearing capacity can be calculated as follows:

$$\rho_n \times \text{factor} = \frac{\rho_o \rho_i}{\rho_o - \rho_i} \times \text{factor}$$

$$= \frac{\rho_o + (\rho_o - \rho_i) \times \rho_i + (\rho_o - \rho_i)}{\rho_o - \rho_i}$$

$$= \frac{\rho_o(2\rho_o - \rho_i)}{\rho_o - \rho_i}$$

$$\text{factor} = \frac{\rho_o(2\rho_o - \rho_i)}{\rho_o \rho_i}$$

$$= \frac{2\rho_o - \rho_i}{\rho_i}$$

giving a percentage increase of $$\frac{2(\rho - \rho_i)}{\rho_i} \times 100$$

If we take by way of example, a typical case where $$\frac{\rho_o - \rho_i}{\rho_i} = 0.05$$

the load capacity of the gears would be increased by 10 percent.

It is envisaged that there is a limit to this centre shift as interference may occur if it is carried too far, but a significant and useful increase in the load carrying capacity of the teeth can be achieved.

The application of the invention to a gear wheel having concave teeth and engaging a complementary rack having convex teeth will be apparent to those skilled in the art.

FIGURES 4 and 5 illustrate the application of the invention to the case of a helical gear wheel engaging an internally-toothed gear wheel.

In FIGURE 4, the inside gear wheel 1X is provided with convex helical teeth 2X, while the outside gear wheel 11X is provided with helical teeth 10X. The centre of curvature 4X of the convex teeth 2X lies on the pitch point 13X and the centre of curvature 8X of the teeth 10X lies on the side of the pitch cylinder of wheel 11X which is remote from the roots of the teeth 10X.

In FIGURE 5, the inside gear wheel 1Y is provided with concave helical teeth 2Y, while the outside gear wheel 11Y is provided with convex helical teeth 10Y. The centre of curvature 4Y of the convex teeth 10Y lies on the pitch point 13Y and the centre of curvature 8Y of the concave teeth 2Y lies on the side of the pitch cylinder of wheel 1Y which is remote from the roots of the teeth 2Y.

What I claim is:

1. A helical gear wheel the profiles of the teeth of which at each transverse cross-section are concave curves based on arcs of circles and suitable for use with a complementary gear wheel or rack having convex teeth surfaces engaging with the concave teeth surfaces, in which the centre of curvature of each concave tooth at each transverse cross-section lies on the side of the pitch cylinder of the gear wheel which is remote from the root of the tooth.

2. A gear rack the profiles of the teeth of which at each transverse cross-section are concave curves based on arcs of circles and suitable for use with a complementary gear wheel having convex teeth surfaces engaging with the concave teeth surfaces, in which the centre of curvature of each concave tooth at each transverse cross-section lies on the side of the pitch line of the gear rack which is remote from the root of the tooth.

3. A helical gear set comprising a helical gear wheel according to claim 1 meshing with a second helical gear wheel the profiles of the teeth of which at each transverse cross-section are convex curves based on arcs of circles, the centre of curvature of each convex tooth at each transverse cross-section being located on the pitch cylinder of this second helical gear wheel.

4. A helical gear set comprising a gear rack according to claim 2 meshing with a helical gear wheel the profiles of the teeth of which at each transverse cross-section are convex curves based on arcs of circles, the centre of curvature of each convex tooth at each transverse cross-section being located on the pitch cylinder of this helical gear wheel.

5. A helical gear set comprising a helical gear wheel according to claim 1 meshing with a gear rack the profiles of the teeth of which at each transverse cross-section are convex curves based on arcs of circles and the centre of each convex tooth at each transverse cross-section being located on the pitch line of the gear rack.

References Cited by the Examiner

UNITED STATES PATENTS 1,538,328   5/24   Holdener _____ 74—462

OTHER REFERENCES

Davies, W. John: "Novikov Gearing" in "Machinery," vol. 96, pages 64–72, January 13, 1960.

Johnson, D. C.: "Gear Teeth with Circular Arc Profiles" in "Engineering" (London, England), page 294, October 2, 1959.

DON A. WAITE, *Primary Examiner.*